July 19, 1938.　　　　R. H. WILMETH　　　　2,124,019
ELECTRIC CLOCK
Filed July 29, 1932
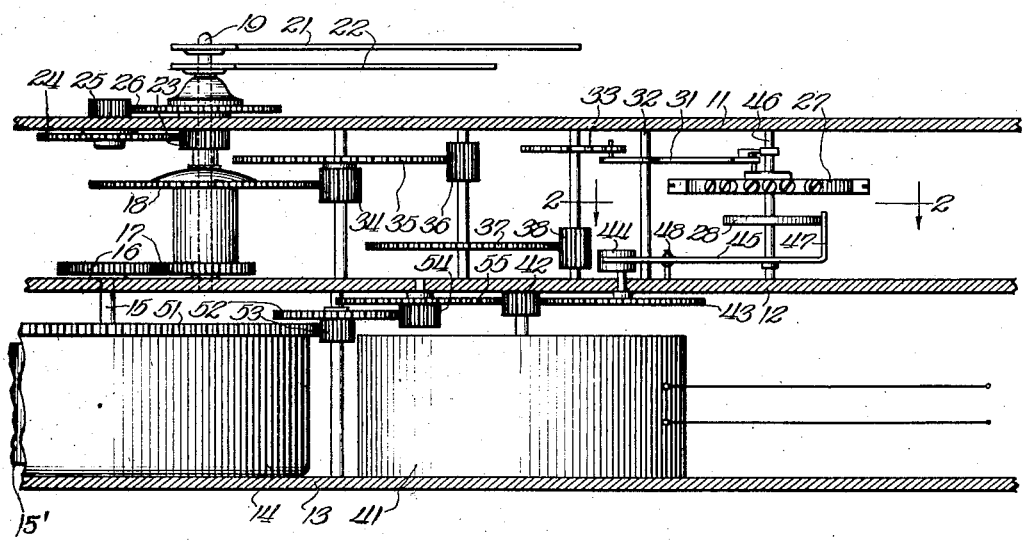
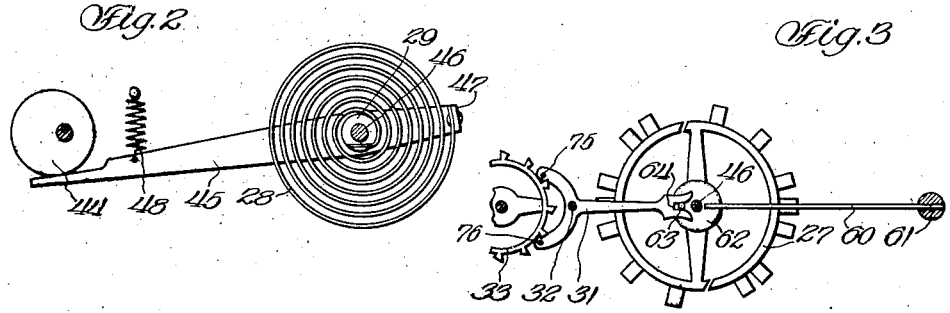
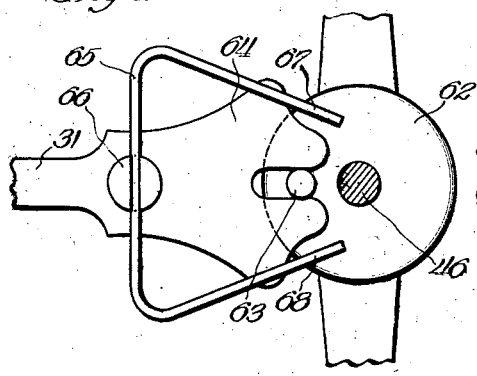
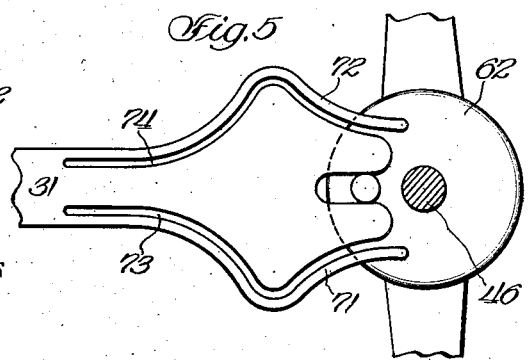
Inventor
Roscoe H. Wilmeth
By Brown, Jackson, Boettcher & Dienner
Attys.

Patented July 19, 1938

2,124,019

UNITED STATES PATENT OFFICE 2,124,019

ELECTRIC CLOCK

Roscoe H. Wilmeth, Springfield, Ill., assignor to Sangamo Electric Company, Springfield, Ill., a corporation of Illinois Application July 29, 1932, Serial No. 625,883

2 Claims. (Cl. 58—26)

The present invention relates in general to electric clocks, and in particular to clocks which are adapted to be controlled by the alternations or pulsations of an electric current.

One of the fundamental objects of the invention is to provide an improved construction of clock wherein the speed of operation of the clock is governed by a synchronous motor serving to control an escapement mechanism in the clock. Specifically, in one embodiment of the invention, a synchronous electric motor imposes periodic beats or like regulatory impulses on the hair spring of the escapement mechanism of the clock so as to regulate its speed of operation.

In this regard, a further object of the invention is to provide improved means, separate from the synchronous motor, for controlling the operation of the vibratory element of the escapement mechanism. In one preferred embodiment of the invention this secondary control means functions to increase the frequency of vibration or oscillation of said vibratory element in response to the increase of amplitude of movement of said element.

Another object of the invention is to provide an improved "carry over" electric clock wherein a clock spring serves to carry over—continue the operation of the clock—when the synchronous electric motor has stopped because of a temporary interruption in the electric circuit. In one preferred embodiment of the clock, the same escapement mechanism on which the synchronous motor imposes its synchronous beats or impulses when said motor is operating serves also to govern the speed of the clock when the electric motor is not operating, thereby providing a simple, inexpensive and efficient arrangement.

Other objects and advantages of the invention will appear from the following description of a preferred embodiment thereof. In the accompanying drawing illustrating such embodiment:

Figure 1 is a fragmentary horizontal sectional view through the frame structure of one form of the clock, showing in plan the various operating parts of the mechanism;

Figure 2 is a fragmentary transverse sectional view taken approximately on the plane of the line 2—2 of Figure 1 and looking in the direction of the arrows, this view illustrating the mechanism for synchronously controlling the oscillations of the balance wheel of the clock;

Figure 3 is a fragmentary view illustrating an escapement and balance wheel and showing my invention supplemented by the provision of the aforesaid secondary controlling means, which is in the form of a resilient stop coacting with the balance wheel for increasing the frequency of the oscillations thereof whenever the amplitude of vibration of said wheel reaches a predetermined value; and Figures 4 and 5 are fragmentary views on a larger scale illustrating alternate forms of this secondary controlling means for the balance wheel.

Referring to Figure 1, a typical supporting frame structure is represented more or less diagrammatically by the three frame plates 11, 12 and 13, between and on which the operating parts are supported. A shaft 15 is journaled in the frame members 12 and 13 and carries rotatably mounted thereon a drum or spring barrel 14 containing a spiral spring 15' of the type generally known as a main spring, the inner end of which is secured to the shaft 15 to drive the same. The shaft 15 drives another shaft 19 by means of two gears 16 and 17 carried by the shafts 15 and 19, respectively. An indicating hand 21 is carried by the shaft 19, and another indicating hand 22, carried by a gear 26, is driven by the shaft 19 through the back gears 23, 24, 25 and 26 to indicate the time in the usual manner. The shaft 19 also drives an escapement movement through a gear train comprising gears 18, 34, 35, 36, 37 and 38. An escapement wheel 33 is carried on the same shaft with the last gear 38 of the train. The escapement movement may be of any conventional construction, and as indicated in Figures 1, 2 and 3 may comprise the escapement wheel 33, a pallet fork 31 fixed on a shaft 32, a balance wheel 27, and a spiral hair spring 28. The balance wheel is secured to and carried by a staff 46, and the inner end of the hair spring is secured to the staff by means of a collar 29. The other end of the hair spring is secured to one end 47 of a rocking beam 45 which is journaled coaxially with the shaft 46 of the balance wheel. This portion of the structure is better illustrated in Figure 2. The other end of the rocking beam 45 is maintained in engagement with a cam 44 by means of a tension spring 48. A synchronous motor 41 is arranged to rotate the cam 44 at a predetermined speed through a suitable gear train represented by the gears 42 and 43. The motor 41 is preferably of the self-starting synchronous type, although it might be of the non-self-starting type.

The spring barrel 14 is provided with a gear 51 secured thereto, this gear being driven by the gear 42 of the motor through a gear train comprising gears 52, 53, 54 and 55. The spring barrel is mounted to rotate freely upon the shaft 15, and can therefore only impart a turning effort to the same through the main spring 15' of the clock. The inner end of said spring is secured to the shaft 15 while the outer end frictionally engages the inner surface of the drum.

In operation the motor 41 acts to rotate the spring barrel 14 and to drive the clock mechanism, the speed of operation of which latter is controlled by the escapement movement. The motor 41 is arranged to drive the spring barrel 14 at a greater rotational speed than that at which the shaft 15 turns, so that whenever the motor 41 is running, it gradually winds up the spring 15' in addition to controlling the clock. The frictional engagement between the outer end of said spring and the drum 14 permits relative slippage between these parts when the spring becomes completely wound. Upon failure of power the motor 41 will stop and maintain the gear 51, the drum 14 and the outer end of the main spring 15' stationary and the inner end of said spring will continue to drive the clock until the spring is completely unwound or until the motor again resumes operation.

The motor 41 also rotates the cam 44 to impart a timed oscillation to the rocking beam 45 to regulate the operation of the escapement movement in a manner to be described presently. When the motor is idle the end 47 of the arm 45 constitutes a stationary support for the hair spring 28. The location of the stationary support thus provided is determined by the position of the cam 44, but irrespective of the position in which this cam should stop the accuracy of the clock is not appreciably disturbed because the throw of the arm 45 is preferably sufficiently small that stoppage of its outer end 47 in any of its possible positions does not materially vary the periodicity of the balance wheel 27.

I shall first describe certain factors and conditions which enter into the control of the escapement mechanism as effected by the synchronous motor, before describing in detail the secondary controlling means which I preferably employ to increase the frequency of oscillation of the escapement mechanism in response to an increase in amplitude.

The balance wheel of a clock, if taken together with its hair spring, constitutes essentially a freely oscillating body describing substantially simple harmonic motion. Simple harmonic motion is a particular kind of oscillation or vibration, and has for one of its properties a periodicity or frequency which is independent of its amplitude of vibration, and which is therefore constant in any particular system. Because of this property of constant frequency of vibration, simple harmonic motion, or an approximation of the same, has been widely used in the control of clock movements.

As a practical matter, true simple harmonic motion is seldom obtainable in a balance wheel, or other controlling movement of a clock mechanism, because some unavoidable friction and air resistance is always present to retard the motion of the balance wheel and to sap its mechanical energy, and consequently the escapement of any clock mechanism must be arranged to supply some driving energy to the balance wheel in order to make up for the loss of energy thus sustained. These forces cause the character of the vibration to differ slightly from the true simple harmonic.

Any oscillating or vibrating system contains within itself a means for exerting what is known as a restoring force, and it is the operation of this restoring force in cooperation with the inertia of the system which produces the phenomena of vibration. In the case of the balance wheel of a clock, this force is supplied by the hair spring. The character of the restoring force, or more precisely its relation to the displacement of the body from its position of rest, determines the character of the vibration which will be described by the oscillating body.

In the present device illustrated in Figures 1 and 2 of the drawing, the free vibration of the system is modified, not only by the frictional retarding forces and the driving force exerted by the escapement, but also by the movement of the rocker arm 45 to which the outer end of the hair spring is anchored. The effect of the periodic movement of the outer end of the hair spring by means of the rocker arm 45, is to impose upon the balance wheel an additional force which is dependent solely upon the motion of the rocking beam 45, and which therefore varies periodically in synchronous relation thereto in response to the synchronous speed of the motor 41.

The restoring force referred to above, and the controlling force imposed by the motion of the rocking beam 45, while they act simultaneously and through the same medium, namely, the hair spring 28, may be considered as being two separate and distinct forces acting upon the same body, namely, the balance wheel 27. This property of independence between the two forces, obtains as a result of the linear relation existing between stress and strain in the hair spring itself, for within the elastic limit, equal increments of deflection of the spring will always result in equal increments of force, irrespective of any deflection which the spring may have previously suffered.

Another factor entering into the behavior of the balance wheel 27 is the driving force exerted by the escapement movement. As previously stated, this driving force is necessary to overcome the retarding force of friction and air resistance in order to maintain the oscillations of the balance wheel. This driving force is applied in the form of a force impulse, and its magnitude varies considerably with the amplitude of vibration of the balance wheel, being at maximum when the amplitude of vibration is small and decreasing rapidly as the amplitude increases. This driving force, therefore, acts to maintain the amplitude of vibration of the balance wheel at such value that the energy imparted by the driving force just equals the energy lost through friction and air resistance. This driving force, of itself, because of the mechanical arrangement of the escapement, has little or no tendency to affect the frequency of vibration of the balance wheel.

In operation the controlling force exerted by the rocking arm 45 upon the hair spring tends to bring the oscillations of the balance wheel 27 into synchronism therewith. If the natural frequency of vibration of the balance wheel is greater than the frequency at which the beam 45 is oscillating, the controlling force exerted thereby will lag behind the oscillations of the balance wheel and tend to retard the motion thereof to decrease its frequency of vibration. Incidentally, the lagging control force will take energy from the vibrating system and the amplitude of vibration will be decreased. However, as the amplitude of vibration decreases, the driving force exerted by the escapement movement will increase, until a stable condition is reached such that the energy supplied by the escapement equals the energy lost to the control force and to friction.

If the frequency of operation of the beam 45, that is, the frequency of the controlling force, is greater than the natural frequency of vibration of the balance wheel, it will lead the vibrations thereof and will tend to increase its frequency and its amplitude of vibration. This increase in amplitude of vibration of the balance wheel 27 will be accompanied by a decrease in the amount of driving force supplied by the escapement, so as to cause the friction and air resistance to oppose the increase in amplitude. This opposition encountered by the controlling force when attempting to increase the amplitude of vibration will usually not be as great as the opposing tendency encountered when attempting to decrease the amplitude of vibration. As the amplitude of vibration increases the driving force is merely removed, so that the controlling force merely is compelled to overcome the frictional and air resistances.

I have found that, when the balance wheel 27 is oscillating at its natural frequency, it will be brought into step with the oscillations of the rocking beam 45, whenever the frequency of such oscillations is within a certain range extending above and below the natural frequency of vibration of the balance wheel. This range extends farther above the natural frequency of vibration of the balance wheel than it extends below the same, that is, the balance wheel may be made to increase its frequency more easily than to decrease it. For this reason I have found it desirable under certain conditions to have the natural period of vibration of the balance wheel to be such as would tend, in the absence of the controlling force from the rocking beam 45 to cause the clock to run slightly slow. I have found further that a balance wheel of this natural period, having been once brought into step with the oscillation of the rocking beam, will maintain synchronism therewith over a considerably greater range of frequency variation.

Referring now to the secondary controlling means which I preferably employ to influence the motion of the balance wheel: I have found that under certain conditions, as when the frequency of the control force exerted by the rocking beam 45 exceeds the natural frequency of vibration of the balance wheel, the amplitude of oscillation of the wheel may rise to such high values as to cause a faulty operation of the escapement mechanism. I therefore prefer to include in my synchronously controlled escapement movement, an improved means for controlling or limiting the amplitude of vibration of the balance wheel. In one form of the invention this is accomplished by associating one or more resilient bumpers with the balance wheel. Such an arrangement is illustrated in Figure 3 of the drawing, wherein there is shown an escapement mechanism comprising an escapement wheel 33, a pallet fork 31 and a balance wheel 27 constructed and arranged substantially as previously described in connection with Figures 1 and 2. There is provided in addition, however, a resilient member 60, which may be a piece of steel wire, and which is secured at one end to the frame structure, as by means of a post 61. The other end of the resilient member 60 is positioned close to the hub 62 of the balance wheel to be engaged by the jewel pin 63. When the oscillating beam 45 is idle, the amplitude of oscillation of the balance wheel 27 will preferably be in the neighborhood of 150 degrees of rotation in each direction from its median or rest position; that is to say, it will rotate through a total arc of approximately 300 degrees. The amplitude of vibration may increase to approximately 180 degrees before the jewel pin 63 strikes against the resilient bumper 60.

When, at any time in the operation of the rocking beam 45, the balance wheel 27 tends to increase its amplitude of vibration above 180 degrees, the pin 63 engages the resilient bumper 60 to reverse the motion of the balance wheel 27 more abruptly than could have been accomplished by the hair spring 28 acting alone. This materially shortens the period of vibration of the balance wheel and consequently increases its frequency of oscillation.

The bumper 60 is in effect a spring supplementing the hair spring 28 in producing the phenomena of vibration in the balance wheel. The bumper or spring member 60, would if continuously engaged by the balance wheel cause it to vibrate at very high frequency. This is because of the relatively greater stiffness of the spring 60 as compared to the hair spring 28. In operation, the balance wheel discontinuously engages the spring 60 and so performs a part of its vibration cycle according to the low frequency induced by the hair spring 28 and a part of its cycle according to the high frequency induced by the bumper spring 60. As the amplitude, or energy, of vibration increases, the portion of the cycle performed under the action of the stiff spring 60 continuously grows larger and the actual frequency of oscillation increases. Thus as long as the balance wheel oscillates with such a small amplitude as to avoid engaging the bumper its period is substantially constant. But when it vibrates under such conditions as to engage the bumper at the end of its swing, it varies its period with amplitude of vibration.

I have found that the balance wheel, when coacting with a resilient bumper, may be made to oscillate under control of the controlling force exerted by the rocking beam 45, at a greater frequency than it could be made to oscillate without the resilient bumper. That is to say, because of the resilient bumper, the balance wheel may be more easily brought into step and maintained in synchronism with the controlling force at frequencies above the natural frequency of vibration of the balance wheel, and the upper limit of the range of frequencies over which the escapement mechainsm may be brought under synchronous control is thereby raised.

Figure 4 illustrates this secondary controlling means in the form of a resilient member upon the fork of the pallet yoke. A spring 65 is secured in any convenient manner at its central point 66, to the pallet fork 31. The ends 67 and 68 of the spring extend out over the hub 62 of the balance wheel so that they may be engaged by the jewel pin 63 when the amplitude of vibration approaches or is in the neighborhood of approximately 360 degrees, that is, when the total arc of oscillation is approximately two complete revolutions.

In the illustration shown, the mechanism occupies its median position. In the rotation of the hub 62 of the balance wheel in a counterclockwise direction, the jewel pin 63 will move the fork 64 of the pallet yoke down until it disengages the same and then the wheel will continue to rotate almost a full turn until the pin 63 engages and rebounds from the spring end 67 which will have been lowered so as to lie directly in its path. When the balance wheel rotates in a clockwise direction from the median or rest position, the pin 63 will strike against and rebound from the end 68 of the spring. The pallets bear against the escapement wheel to support the force of the balance wheel stopping against the arms 67 and 68. The pallets are indicated by the reference numerals 75 and 76 in Figure 3. As previously described, the construction and operation are preferably such that the jewel pin 63 will not ordinarily engage the spring arms 67 and 68 but only when the amplitude of oscillation of the balance wheel is relatively large.

Figure 5 illustrates another method by which I may provide a pair of resilient bumpers upon the fork of the pallet yoke. Slits 73 and 74 are cut along the edges of the fork to provide two slender resilient arms 71 and 72. These arms 71 and 72 will be engaged by the pin 63 in the same relation as are the spring ends 67 and 68 of Figure 4.

It will be seen that I have provided improved apparatus for synchronizing the speed of a clock with an alternating current circuit; and have also provided a simple and inexpensive construction of "carry over" clock which may be definitely synchronized with an alternating current power supply. Whenever power is supplied to the motor 41, it will drive the clock mechanism and gradually wind up the main spring 15' contained within the drum 14, and will at the same time regulate the oscillation of the balance wheel to synchronously control the time indicating mechanism. When the power supply is interrupted, the driving spring continues to drive the clock and the escapement movement controls the speed of operation in accordance with the natural frequency of vibration of the balance wheel.

While I have disclosed a number of specific forms of my invention, it is apparent that the same is capable of other variations and embodiments. I therefore do not wish to be limited to the present specific disclosure, but wish to include all modifications and variations thereof as fall within the scope of the appended claims.

I claim:

1. In a clock, the combination of an escapement mechanism comprising a pallet fork and a balance wheel, a synchronous electric motor, means actuated by said motor for controlling the oscillations of said balance wheel, and resilient means coacting between said pallet fork and said balance wheel for modifying certain abnormal amplitudes of oscillations of said wheel caused by said motor actuated means.

2. In a clock, the combination of an escapement mechanism comprising a pallet fork, a balance wheel and a hair spring, a synchronous electric motor, means actuated by said motor for controlling the oscillations of said balance wheel through said hair spring, a projection on said balance wheel, and spring arms on said pallet fork adapted to be engaged by said projection.

ROSCOE H. WILMETH.